(12) United States Patent
Jung et al.

(10) Patent No.: US 9,542,974 B2
(45) Date of Patent: Jan. 10, 2017

(54) VIDEO MANAGEMENT SYSTEM AND METHOD FOR EVENT RECORDING USING THE SAME

(71) Applicant: IDIS Co., Ltd., Daejeon (KR)

(72) Inventors: Hee Lock Jung, Gyeonggi-do (KR); Jin Hui Park, Gyeonggi-do (KR); Jai Min Jung, Gyeonggi-do (KR)

(73) Assignee: IDIS Co., Ltd., Daejeon (KR)

( * ) Notice: Subject to any disclaimer, the term of this patent is extended or adjusted under 35 U.S.C. 154(b) by 0 days.

(21) Appl. No.: 14/605,892

(22) Filed: Jan. 26, 2015

(65) Prior Publication Data

US 2016/0217822 A1 Jul. 28, 2016

(51) Int. Cl.
*H04N 5/765* (2006.01)
*G11B 20/10* (2006.01)
*G11B 20/18* (2006.01)

(52) U.S. Cl.
CPC ..... *G11B 20/10527* (2013.01); *G11B 20/1803* (2013.01); *H04N 5/765* (2013.01); *G11B 2020/10537* (2013.01); *G11B 2020/10685* (2013.01)

(58) Field of Classification Search
None
See application file for complete search history.

(56) References Cited

U.S. PATENT DOCUMENTS

2010/0118150 A1* 5/2010 Boland ............... H04N 5/2259 348/207.1
2011/0023075 A1* 1/2011 Tanabe ............... H04N 21/241 725/114
2015/0318020 A1* 11/2015 Pribula ............... G11B 27/031 386/227

FOREIGN PATENT DOCUMENTS

| KR | 10-2010-0058121 | 6/2010 |
| KR | 10-2012-0118789 | 10/2012 |
| KR | 2013-0124757 | 11/2013 |
| KR | 10-2014-0094953 | 7/2014 |
| KR | 10-2014-0136802 | 12/2014 |

OTHER PUBLICATIONS

Korean Notice of Allowance mailed on Oct. 28, 2016 from corresponding application No. 10-2015-0008769.

* cited by examiner

*Primary Examiner* — Eileen Adams
(74) *Attorney, Agent, or Firm* — Intellectual Property Law Group LLP

(57) ABSTRACT

Provided is a video management apparatus and a method for event recording using the same, which are capable of reducing loss of video data in an event recording. The video management apparatus performs an event recording in cooperation with a network camera to transmit a first frame with basic information of video data and a plurality of second frames with changed information of the video data. The video management apparatus includes a buffer unit to store the first and the plurality of second frames, and eliminate the stored frames according to an external control signal. The video management apparatus further includes an event recording unit to save the first frame and at least one of the second frames stored in the buffer unit, and when detecting an occurrence of events, and frames transmitted from the network camera after the detection of the occurrence of events on a storage medium.

7 Claims, 2 Drawing Sheets

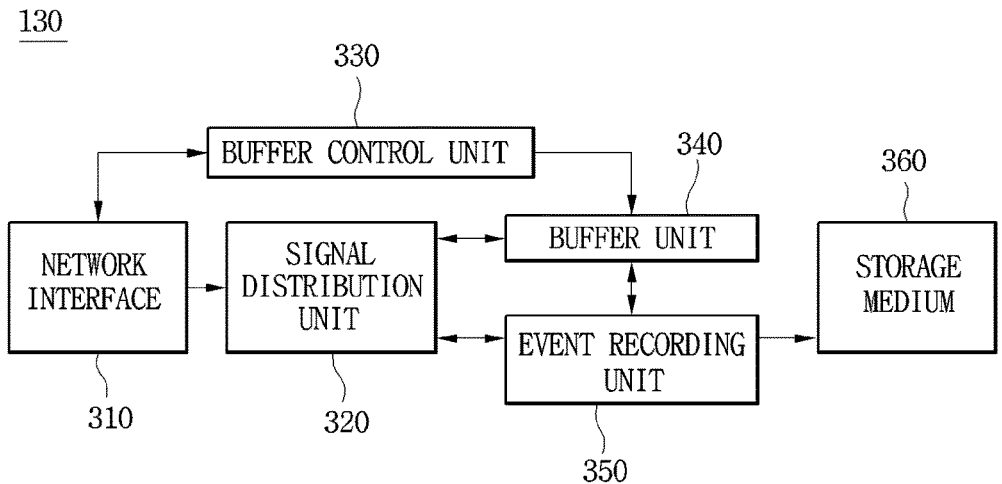
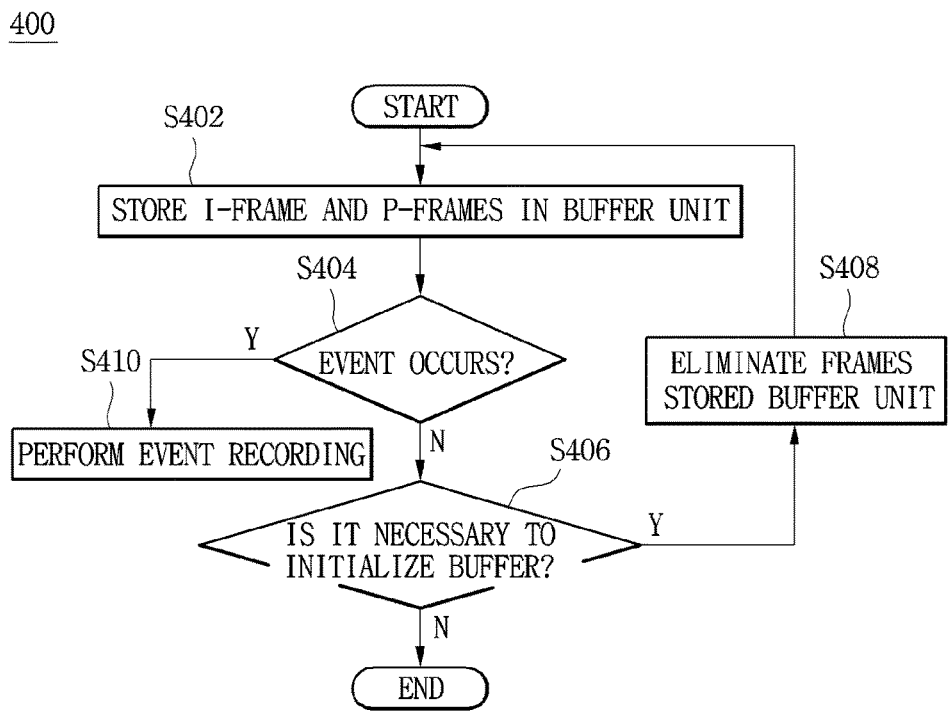

VIDEO MANAGEMENT SYSTEM AND METHOD FOR EVENT RECORDING USING THE SAME

BACKGROUND OF THE INVENTION

1. Technical Field

The present invention relates to a video management apparatus and a method for event recording using the same capable of reducing loss in video recording based on an occurrence of events.

2. Related Art

As known in the art, network cameras transmit video that is captured in a compressed form to a video management system (VMS) via a network because of the constraint of network bandwidth. In the field of video compression, video consists of an I-frame (Intra frame) followed by a number of P-frames (Predicted frames). The I-frame is used as a requisite reference or key data in video decoding. I-frames have more data than other frames and thus may have an effect on designing network bandwidth and storage space of the video management system depending on how often the I-frames are transmitted.

Meanwhile, the video management system may rather employ event recording methods than real-time recording methods, as shown in, for example, the Korean Patent Laid-Open Publication No. 2013-0124757 (published on Nov. 15, 2013).

An event recording method requires a certain time to get video after requesting it from video sources such as network cameras, which results in that a portion of the video to be recorded may be lost for the certain time.

In order to solve the above mentioned problem, the video management system utilizes pre-event recording methods.

A pre-event recording method refers to an approach to continue a pseudo-recording even in a situation where no event occurs, and pseudo-recorded information may be used as actual recorded information upon the occurrence of events, which may prevent the loss of the recorded material in the event recording method. In the pre-event recording method, the time for the pseudo-recording may be set by a user or as a default value to the video management system.

In the pre-event recording method, the longer the time for the pseudo recording is, the more the storage space of the video management system may be wasted. Therefore, it is common to set the time for the pseudo recording time as short as possible.

For a short pseudo recording time, however, any key frame, which is requisite in a video decoding, i.e., any I-frame may not be available during the short pseudo recording time, which makes the video recording abnormal.

SUMMARY OF THE INVENTION

In view of the above, one or more embodiments of the present invention provide a video management system and a method for event recording using the same, which are capable of enhancing reliability of recorded video in an event recording, in a way of buffering frames having basic information of video data to be included in the recorded video to store them in a buffer, and upon detecting an occurrence of events, saving the frames stored in the buffer unit and frames received from a network camera after the occurrence of events on a recording media.

Further, one or more embodiments of the present invention provide a video management system and a method for event recording using the same, which are capable of initialing the buffer at every transmission period of frames having basic information of video data of the network camera or every receipt of frames having basic information of video data.

In accordance with an embodiment of the present invention, there is provided a video management apparatus for event recording in cooperation with a network camera to transmit a first frame with basic information of video data and a plurality of second frames with changed information of the video data, the video management apparatus including a buffer unit configured to store the first frame and the plurality of second frames, and eliminate the stored frames according to an external control signal; and an event recording unit configured to save the first frame and at least one of the second frames stored in the buffer unit upon detecting an occurrence of events, and frames transmitted from the network camera after the detection of the occurrence of events on a storage medium.

The video management apparatus may further include a buffer control unit configured to generate the external control signal at every transmission period for the network camera to transmit the first frame or at every receipt of the first frame.

The video management apparatus may further include a signal distribution unit configured to direct frames received from the network camera to the buffer unit, before the detection of the occurrence of events, and direct frames received from the network camera to the event recording unit, after the detection of the occurrence of events.

The event recording unit may detect the occurrence of events on a basis of an event occurrence signal received from the network camera or information on recording settings.

Further, the information on recording settings may be set by an administrator of the video management apparatus or received from a client terminal connected over a network.

In accordance with another embodiment of the present invention, there is provided a method for event recording performed by a video management apparatus connected with a network camera over a network, which transmits consecutively a first frame with basic information of video data and a plurality of second frames with changed information of the video data, the method including storing the first frame and the plurality of second frames in a buffer unit; detecting an occurrence of events during the storing of the first frame and the second frames; and saving the first frame and at least one of the second frames stored in the buffer unit upon detecting the occurrence of event, and frames transmitted from the network camera after the detection of the occurrence of events on a storage medium.

The method may further include determining whether an event recording reaches a predetermined time in a case where no event occurs; and eliminating the frames stored in the buffer unit if it is determined that an event recording reaches a predetermined time.

The method may further include determining whether a following first frame is newly received from the network camera when there is no detection of events; eliminating the frames stored in the buffer unit if it is determined that the following first frame is newly received, and storing the following first frame in the buffer unit.

Detecting an occurrence of events may include detecting the occurrence of event on a basis of an event occurrence signal received from the network camera or information on recording settings.

Further, the information on recording settings may be set by an administrator of the video management apparatus or received from a client terminal connected over the network.

BRIEF DESCRIPTION OF THE DRAWINGS

The features and advantages of the present invention will be more apparent from the following detailed description in conjunction with the accompanying drawings, in which:

FIG. 3 is a detailed block diagram of a video management apparatus in accordance with an embodiment of the present invention; and FIG. 4 is a flow diagram illustrating a method for event recording performed by a video management apparatus based on an occurrence of events in accordance with an embodiment of the present invention.

DETAILED DESCRIPTION OF THE INVENTION

Hereinafter, exemplary embodiments of the present invention will be described in detail with reference to the accompanying drawings. The following description is provided to help comprehensive understanding of a method, apparatus and/or system disclosed herein. However, it is an exemplary one only and the present invention is not limited thereto.

In the following description, well-known functions or constitutions will not be described in detail if they would unnecessarily obscure the invention in detail. Further, the terms to be described below are defined in consideration of functions in the embodiments of the present invention and may vary depending on a user's or operator's intention or practice. Accordingly, the definition may be made on a basis of the contents throughout the specification. The terms used herein are employed only to describe specific embodiments, but are not intended to limit the present invention thereto.

Figure 1:
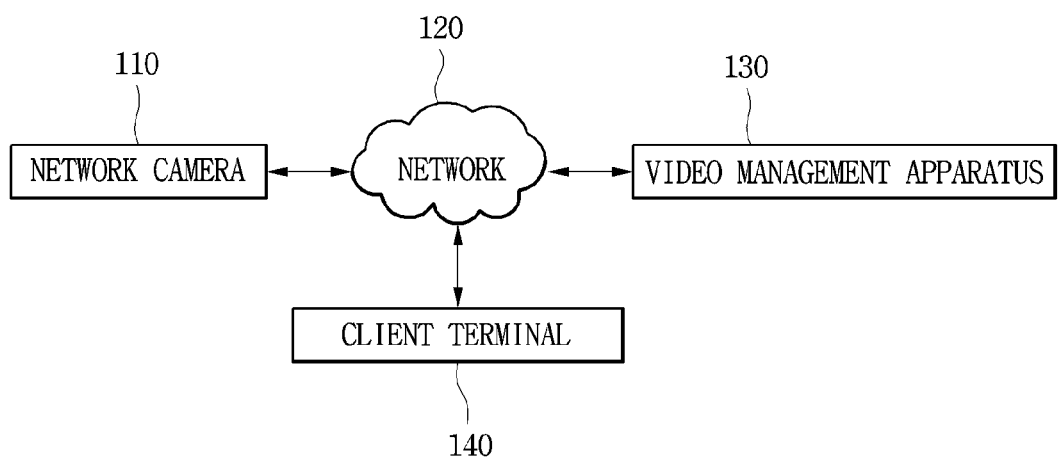
FIG. 1 is a schematic block diagram of a video management system in accordance with an embodiment of the present invention.
Figure 2:
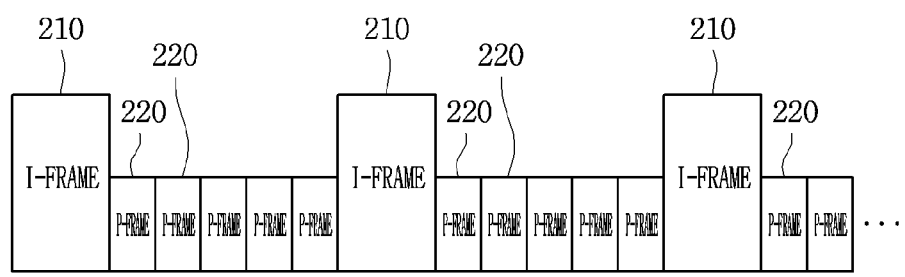
FIG. 2 illustrates an exemplary structure for video data transmitted from a network camera in accordance with an embodiment of the present invention.

FIG. 1 is a schematic block diagram of a video management system 100 in accordance with an embodiment of the present invention.

As shown in FIG. 1, the video management system 100 may include a network camera 110, a video management apparatus 130, and a client terminal 140, all of which are connected over a network 120.

The network camera 110, which may have a video coding (compression) capability, may send audio and video data in real-time using various protocols such as for example RTP (Real-Time Transport Protocol), RTSP (Real-Time Streaming Protocol), RTCP (Real-Time Control Protocol) in H.323 standard. Specifically, the network camera 110 may capture certain a given surveillance space to produce video data, compress the video data, and then transmit the compressed video data to the video management apparatus 130 using any protocols via the network 120.

In the embodiment of the present invention, the video data may be comprised of I-frames (Intra-frames) 210 and P-frames (Predicted frames) 220. An I-frame 210 includes information which is the basis of a video (hereinafter it is referred to as 'basic information'), and a P-frame 220 includes only the data that have changed from a previous frame (hereinafter it is referred to as 'changed information').

The network camera 110 transmits an I-frame 210 corresponding to the basic information, followed by a plurality of P-frames 220. At predetermined time intervals or at every time where the basic information is varied, the network camera 110 transmits a respective new I-frame 210 and then a plurality of new P-frames 220 having changed information again.

Further, the network camera 110 detects the occurrence of events and produces an event occurrence signal indicative of the occurrence of events, which is in turn sent to the video management apparatus 130. Here, the occurrence of events may be sensed by sensors such as motion sensors, alarm sensors, etc., or detected on a basis of any changes in video captured by the network camera, but is not limited thereto.

The network 120 refers to any network to interconnect the network camera 110 and the video management apparatus 130 together and may include wired networks and wireless networks.

The video management apparatus 130 is responsible for storing and managing the video data transmitted from the network camera 110 through the use of the event recording function.

The details of the video management apparatus 130 will be discussed with reference to FIG. 3.

FIG. 3 illustrates a detailed block diagram of the video management apparatus in accordance with an embodiment of the present invention.

As illustrated in FIG. 3, the video management apparatus 130 may include a network interface 310, a signal distribution unit 320, a buffer control unit 330, a buffer unit 340, an event recording unit 350, and a storage medium 360.

The network interface 310 may receive video data transmitted from the network camera 110 and provide the same to either the buffer unit 340 or the event recording unit 350 via the signal distribution unit 320.

Further, the network interface 310 may receive an event occurrence signal indicating the occurrence of events from the network camera 110 and forward the event occurrence signal to the event recording unit 350.

Upon receiving an I-frame 210 through the network interface 310 before detecting the occurrence of events, the signal distribution unit 320 may direct the I-frame 210 toward the buffer unit 340 to be stored and then allows P-frames 220 received through the network interface 310 to be stored in the buffer unit 340.

Further, the signal distribution unit 320 may direct signals received through the network interface 310, that is, I-frame 210 or P-frames 220, to the event recording unit 350 after the occurrence of events is detected.

The buffer control unit 330 may check whether the I-frame 210 has been received through the network interface 310, and based on the check result, determine whether to initialize the frames stored in the buffer unit 340 so as to control the buffer unit 340. Specifically, the buffer control unit 330 may initialize the buffer unit 340 if a first I-frame 210 has been received and another I-frame 210 of next sequence is received at a later time. After that, the buffer control unit 330 may allow another I-frame 210 and following P-frames 220 to be stored in the buffer unit 340.

Further, the buffer control unit 330 may control the buffer unit 340 based on a transmission period of I-frames of the network camera 110. More specifically, the buffer control unit 330 may initialize the buffer unit 340 based on the transmission period of I-frames of the network camera 110.

According to the embodiments of the present invention, the initialization of the buffer unit 340 may mean the operation to eliminate the frames stored up to now in the buffer unit 340.

The buffer unit 340 serves to store frames provided through the signal distribution unit 320 and may be implemented as, for example, circular buffers.

The event recording unit 350, in response to the detection of the occurrence of events, may save the video data stored in the buffer unit 340, i.e., the I-frame 210 and P-frames 220 and the frames provided through the signal distribution unit 320 on the storage medium 360. Specifically, the event recording unit 350 may save the I-frame 210 and P-frames 220 stored in the buffer unit 340 on the storage medium 360 when the occurrence of events is detected and then save the frames provided through the signal distribution unit 320 on the storage medium 360.

In accordance with the embodiments, the occurrence of events may be checked on a basis of an event occurrence signal received via the network interface 310 or information on recording settings. Here, information on recording settings may be set by an administrator of the video management apparatus 130 or through the client terminal 140 connected over the network 120.

The storage medium 360 is used to save the video data received from the network camera 110 and may be implemented as, for example, hard-disk drives, memories, and the like.

The client terminal 140 refers to a device at the user's side having an access to the video management apparatus 130 over the network 120 and may include smart phones, personal computers, notebooks, and the like.

Further, the client terminal 140 may control the network camera 110 through the connection with the video management apparatus 130 as well as provide the information on recording settings to the video management apparatus 130.

A method for performing an event recording by the video management apparatus 130 based on the occurrence of events will be explained with reference to FIG. 4.

FIG. 4 is a flow diagram illustrating a method 400 for event recording performed by the video management apparatus 130 based on the occurrence of events in accordance with an embodiment of the present invention.

The method 400 for event recording illustrated in FIG. 4 may be carried out by, for example, the video management apparatus 130. While the method described in the flow diagram has been shown and described by dividing it into a plurality of steps, at least some of method steps may be run out of order, performed along with other steps by combining with them, omitted from the described method, performed with subsets of the method by subdividing them into subsets, or performed with one or more additional steps added thereto. In addition, in alternative embodiments, one or more other steps which are not illustrated in FIG. 4 may be performed along with the method described in FIG. 4.

As illustrated in FIG. 4, the video management apparatus 130 allows an I-frame 210 and a plurality of P-frames 220 transmitted from the network camera 110 to be stored consecutively in the buffer unit 340 at Step S402. Specifically, the video management apparatus 130 allows the I-frame 210 and the P-frames 220 received from the network interface 310 to be stored in the buffer unit 340 through the signal distribution unit 320.

Next, the video management apparatus 130 determines whether any event occurs at Step S404. Specifically, the video management apparatus 130 determines whether it is necessary to record video data according to predetermined information on recording settings or whether an event detection signal is received.

As a result of the determination at Step S404, if no event has occurred, the method advances to Step S406 where the video management apparatus 130 determines whether to initialize the buffer unit 340. Specifically, the video management apparatus 130 checks whether a current time reaches a preset transmission period for the network camera 110 to transmit an I-frame or a following I-frame 210 is newly received through the network interface 310 to determine whether it is necessary to eliminate the frames stored in the buffer unit 340.

As a result of the determination at Step S406, if it is necessary to perform the initialization, the method goes to Step S408 to eliminate the frames stored in the buffer unit 340 and then loops back to Step S402 to perform the operations as described above. Specifically, the video management apparatus 130 eliminates the frames stored in the buffer unit 340 and allows the I-frame 210 and P-frames 220 that are newly received through the network interface 310 to be stored in the buffer unit 340.

However, as a result of the determination at Step S406, if the initialization is not necessary, the method loops back to Step S402 to perform the operations as described above.

Meanwhile, as a result of the determination at Step S404, if the event has occurred, the video management apparatus 130 allows the frames stored in the buffer unit 340 and the frames that are received through the network interface 310 after the occurrence of events to be saved on the event recording unit 350, so that the event recording can be started, at Step S410.

The embodiments of the present invention may be implemented in the form of program instructions that can be performed by means of a variety of computers and that can be recorded in a computer-readable medium. The computer-readable medium may include, alone or in combination with the program instructions, local data files, local data structures, and the like. The program instructions recorded in the computer-readable medium may include things or computer software specially designed and constructed for the purpose of the present invention or generally known or conveniently available to those skilled in the art. Examples of computer-readable medium may include, but is not limited to, magnetic media such as hard disks, floppy disks and magnetic tapes; optical recording media such as CD-ROM, DVD, etc.; magneto-optical media such as floptical disks; and hardware devices that are specially configured to store and perform the program instructions, such as ROM, RAM, flash memory, etc. Examples of the program instructions may include machine codes, as well as high-level language codes that can be produced by compilers or interpreters and can be executed by a computer.

While the embodiments of the present invention have been illustrated and described as described above, it will be appreciated by those skilled in the art that various modifications, additions and substitutions to the embodiments are possible, without departing from the scope of the present invention. Therefore, the scope of the present invention is not limited to the described embodiments, but should be defined by the accompanying claims and equivalents thereof.

What is claimed is:

1. A video management apparatus for event recording in cooperation with a network camera to transmit a first frame with basic information of video data and a plurality of second frames with changed information of the video data, the video management apparatus comprising:
- a processor;
- a storage medium;
- a buffer configured to store the first frame and the plurality of second frames, and eliminate the stored frames according to an external control signal;
- a buffer controller configured to generate the external control signal at every transmission period for the network camera to transmit the first frame or at every receipt of the first frame;
- an event recorder configured to save the first frame and at least one of the second frames stored in the buffer upon detecting an occurrence of events, which are sensed by sensors to detect changes in the video data, and save frames transmitted from the network camera after the detection of the occurrence of events on the storage medium, thereby recording all video frames both before and after the occurrence of events, thus eliminating any security gaps caused by not recording the video frames stored in the buffer before the occurrence of events; and
- a signal distributor configured to direct frames received from the network camera to the buffer, before the detection of the occurrence of events, and direct frames received from the network camera to the event recorder, after the detection of the occurrence of events.

2. The video management apparatus of claim 1, wherein the event recorder detects the occurrence of events on a basis of an event occurrence signal received from the network camera or information on recording settings.

3. The video management apparatus of claim 2, wherein the information on recording settings is set by an administrator of the video management apparatus or received from a client terminal connected over a network.

4. A method for event recording performed by a video management apparatus connected with a network camera over a network, which transmits consecutively a first frame with basic information of video data and a plurality of second frames with changed information of the video data, the method comprising:
- storing the first frame and the plurality of second frames in a buffer;
- detecting an occurrence of events during the storing of the first frame and the second frames;
- determining whether an event recording reaches a predetermined time in a case where no event occurs;
- eliminating the frames stored in the buffer if it is determined that an event recording reaches a predetermined time; and
- saving the first frame and at least one of the second frames stored in the buffer upon detecting the occurrence of events, which are sensed by sensors to detect changes in the video data, and saving frames transmitted from the network camera after the detection of the occurrence of events on a storage medium, thereby recording all video frames both before and after the occurrence of events, thus eliminating any security gaps caused by not recording the video frames stored in the buffer before the occurrence of events.

5. The method of claim 4, further comprising:
- determining whether a following first frame is newly received from the network camera when there is no detection of events;
- eliminating the frames stored in the buffer if it is determined that the following first frame is newly received, and storing the following first frame in the buffer.

6. The method of claim 4, wherein said detecting an occurrence of events comprises:
- detecting the occurrence of events on a basis of an event occurrence signal received from the network camera or information on recording settings.

7. The method of claim 6, wherein the information on recording settings is set by an administrator of the video management apparatus or received from a client terminal connected over the network.

* * * * *